April 30, 1929.  P. B. STEED  1,710,748

GENERATOR CONTROL SYSTEM

Filed March 1, 1924

WITNESSES:

INVENTOR
Paul B. Steed.
BY
ATTORNEY

Patented Apr. 30, 1929.

1,710,748

UNITED STATES PATENT OFFICE.

PAUL B. STEED, OF WILKINSBURG, PENNSYLVANIA, ASSIGNOR TO WESTINGHOUSE ELECTRIC & MANUFACTURING COMPANY, A CORPORATION OF PENNSYLVANIA.

GENERATOR-CONTROL SYSTEM.

Application filed March 1, 1924. Serial No. 696,183.

My invention relates to generator control systems and particularly to automatic paralleling of generators.

The object of my invention is to provide means for automatically paralleling relatively hot and cold generators in such manner that the load being supplied by the generators is substantially evenly distributed therebetween during the time before the various generators attain substantially the same degree of temperature.

In practicing my invention, I provide an electrical distribution system and a plurality of generators for supplying energy thereto. One of the generators is adapted to supply energy to the distribution system at all times and the additional generators are adapted to be connected to the system when they are needed. For each additional generator, I provide means for so automatically regulating the field magnet excitation thereof as to cause each generator to assume a proportionate part of the load on the system when one of the additional machines is connected to the system.

Figure 1:
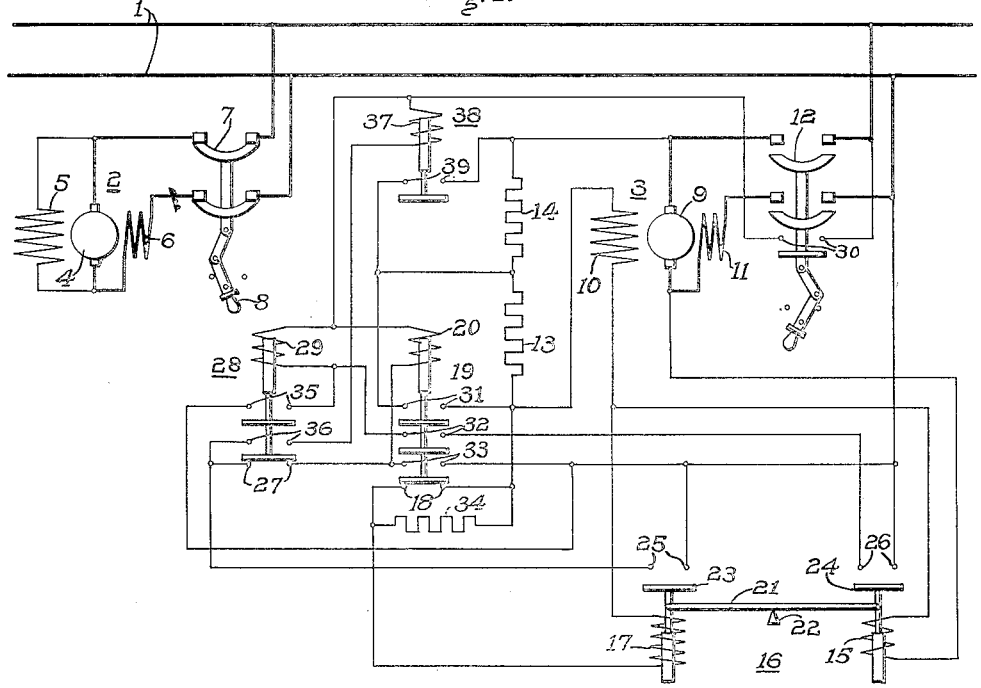
Figure 2:
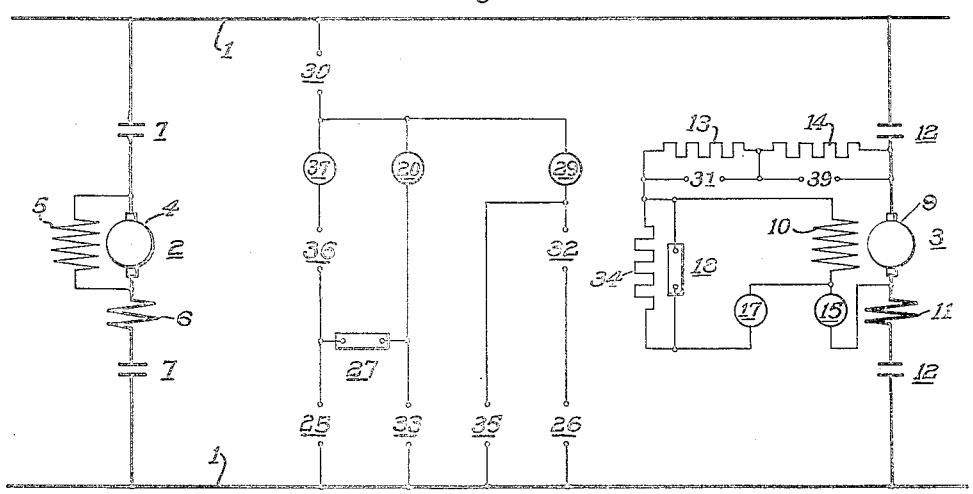

In the accompanying drawings,

Figure 1 is a diagrammatic representation of an electrical system in which my invention is embodied, and Fig. 2 is a schematic representation of the same circuits.

Referring to Fig. 1 of the drawings, a distribution circuit 1 is adapted to receive energy from generators 2 and 3, the generator 2 being adapted to supply energy to the circuit 1 at all times and the generator 3 to be connected to the circuit 1 whenever it is needed. It is obvious that an indefinite number of additional generators may be provided to supply energy to the circuit 1, each of which would be provided with the system embodying my invention. Only the generator 3 has been shown in the drawings, however, as my invention is clearly set forth in connection with this generator.

The generator 2 has an armature member 4, a shunt field-magnet winding 5 and a series field-magnet winding 6. Connection between the generator 2 and the circuit 1 is effected by closing a circuit interrupter 7 that is adapted to be manually operated by a handle 8. In similar manner, the generator 3 has an armature member 9, a shunt field-magnet winding 10 and a series field-magnet winding 11. A circuit interrupter 12 is provided for connecting the generator 3 to the circuit 1.

Let it be assumed that the generator 2 is alone supplying energy to the circuit 1 and that it is desired to add the output of the generator 3 to that of the generator 2. Let it also be assumed that the generator 3 is either kept running at all times or is started before it is desired to connect it to the circuit 1. No means have been shown for driving the generators 2 and 3, as such means do not comprise a part of my invention, but it is obvious that driving means would be provided for each generator.

With the generator 3 running at its normal speed, the circuit interrupter 12 is closed to connect this generator to the circuit 1. The generator 3 then begins to add its output to that of the generator 2 for supplying energy to the circuit 1. Under ordinary conditions, however, the generator 3 being relatively cold because it has not been operating under load and the generator 2 being relatively hot because it has been operating under load, the resistance of the shunt field-magnet winding 10 of the generator 3 will be considerably less than that of the shunt field-magnet winding 5 of the generator 2. Consequently, with the same voltage, namely the voltage of the circuit, impressed upon the two windings 5 and 10, considerably greater current would traverse the winding 10 than would traverse the winding 5. The field magnets of the generator 3 would thus be more strongly excited than those of the generator 2 and the generator 3 would assume a greater part of the load demand on the circuit 1 than would the generator 2. The system embodying my invention is intended to overcome this difficulty.

When the circuit interrupter 12 is closed to connect the generator 3 to the circuit 1, the shunt field-magnet winding 10 is connected through resistors 13 and 14 and an operating coil 15 of a resistance-measuring relay 16, across the terminals of the armature 9. The resistance of the resistors 13 and 14 is of such value that the current traversing the relatively cold field-magnet winding 10 of the generator 3 is limited to substantially the value of current that is traversing the relatively hot field-magnet winding 5 of the generator 2. Thus, the excitation of the field magnets of the two generators is substantially the same and the load demand of the circuit 1 is evenly distributed between the two machines.

As the temperature of the generator 3 rises after this machine has been operating for a time under load, the resistance of the field-magnet winding 10 increases because of its temperature-resistance characteristic, and the current traversing this winding is proportionately decreased. Therefore, in order to prevent the generator 3 from carrying substantially less than its proportionate part of the total load, it is necessary to decrease the resistance of the circuit extending through the field-magnet winding 10. It is for this purpose that the resistance measuring relay 16 is provided.

The connection of the operating coil 15 of the relay 16 in series relation to the field-magnet winding 10 has already been described. The relay 16 has another operating coil 17 that is connected in parallel relation to the field-magnet winding 10 through contact members 18 of a relay 19 that are engaged when an operating coil 20 of the relay 19 is de-energized, as is now the case.

The operating coils 15 and 17 of the relay 16 co-operate with separate armature members that are balanced against each other through a lever arm 21 that is supported by a fulcrum 22. The lever arm 21 supports a bridging member 23 at one end and a bridging member 24 at the other end thereof. These bridging members are adapted to engage contact members 25 and 26, respectively.

When the energization of the coil 15 is such as to attract its armature member more strongly than the energization of the coil 17 attracts its armature member, the contact members 26 are engaged by the bridging member 24, and when the opposite condition obtains, the contact members 26 are disengaged by the bridging member 24 and the contact members 25 are engaged by the bridging member 23.

The coil 17 being connected in parallel relation to the field-magnet winding 10, and the coil 15 being connected in series relation to the same winding, and these coils being so disposed in the relay 16 that their effects tend to counteract each other, it will be seen that the operation of the relay 16 is dependent upon the resistance of the field-magnet winding 10. That is, when the resistance of the winding 10 is relatively low, as is the case when the generator 3 is relatively cold, the ratio of the voltage between the terminals of the winding 10 to the current traversing this winding is by Ohm's law, also relatively low. When the ratio of voltage and current is relatively low, the energization of the operating coil 15 overbalances that of the coil 17 to maintain the bridging member 24 in engagement with the contact members 26 and the bridging member 23 out of engagement with the contact members 25.

As the temperature of the generator 3 rises and causes the resistance of the field-magnet winding 10 to increase, the ratio of the voltage across this winding to the current traversing this winding is likewise increased. When this ratio increases to a predetermined value, the energization of the coil 17 becomes sufficient to counteract the action of the coil 15, thereby causing the bridging member 24 to be actuated out of engagement with the contact members 26 and the bridging member 23 to be actuated into engagement with the contact members 25.

When the contact members 25 are engaged, a circuit is completed from the distribution circuit 1 to the operating coil 20 of the relay 19 through the contact members 25, contact members 27 of a relay 28 that are engaged when an operating coil 29 of the relay 28 is de-energized, and a pair of auxiliary contact members 30 of the circuit interrupter 12 that are engaged when this circuit interrupter is closed.

Energization of the operating coil 20 of the relay 19 causes this relay to effect disengagement of its contact members 18 and engagement of its contact members 31, 32 and 33, respectively. The contact members 31 so shunt the resistor 13 that, when they are engaged, the resistor 13 is no longer effective to limit the current traversing the field-magnet winding 10. This current is therefore increased to increase the excitation of the field magnets of the generator 3 and thereby prevent this generator from carrying less than its proportionate part of the total load demand on the circuit 1.

When the contact members 18 are disengaged because of the operation of the relay 19, a resistor 34 that is connected in parallel relation to the contact members 18 is inserted in the circuit extending through the operating coil 17 of the relay 16. The setting of the relay 16 is thereby changed to make this relay responsive to a greater value of resistance in the field-magnet winding 10 than previously. As soon as the resistor 34 is inserted in circuit with the coil 17, the ratio of energization of the coils 15 and 17 is so changed that the relay 16 returns to its original condition in which the contact members 25 are disengaged and the contact members 26 are engaged.

The contact members 33 of the relay 19 so shunt the contact members 27 of the relay 28 and the contact members 25 of the relay 16 that energization of the operating coil 20 of the relay 19 is maintained after either or both of the contact members 25 and 27 are disengaged. Engagement of the contact members 32 because of the operation of the relay 19, and engagement of the contact members 26 by the bridging member 24 because of the return of the relay 16 to its original condition, completes a circuit extending from the distribution circuit 1 to the operating coil 29 of the relay 28. This coil is thereby energized to cause the relay 28 to effect disengagement of its contact members 27 and engagement of its contact members 35 and 36, respectively. The contact members 35 so shunt the contact members 26 and 32, respectively, that energization of the operating coil 29 of the relay 28 is maintained after either or both of these contact members are disengaged.

As the temperature of the generator 3 continues to rise, the resistance of its field-magnet winding 10 likewise continues to increase until it reaches the predetermined value corresponding to the new setting of the relay 16. When it reaches this value, the relay 16 operates in the manner previously described to effect disengagement of its contact members 26 and engagement of its contact members 25. When the contact members 25 are engaged at this time, a circuit is completed from the distribution circuit 1 to an operating coil 37 of a relay 38, through the contact members 36 of the relay 28 that are engaged because this relay is in its energized condition.

Energization of the coil 37 causes the relay 38 to effect engagement of its contact members 39. The contact members 39 so shunt the resistor 14 that this resistor is no longer effective to limit the current traversing the field-magnet winding 10 of the generator 3. Both of the resistors 13 and 14 are now short-circuited and the field-magnet winding 10 of the generator 3 is connected across the terminals of the armature member 9 through the contact members 39 and 31, respectively, and the operating coil 15 of the relay 16.

It may be considered that the temperature of the generator 3 has, by this time, risen to a normal operating degree and it is no longer necessary to provide resistance in circuit with the field-magnet winding 10 to limit the current traversing this winding. While I have shown only two resistors 13 and 14 to be connected in circuit with the winding 10 when the generator 3 is connected to the circuit 1, it is obvious that the total amount of resistance be so connected could be divided into any desired number of steps to be individually short-circuited in response to the action of the resistance-measuring relay 16.

When it is desired to disconnect the generator 3 from the distribution circuit 1, the circuit interrupter 12 is manually opened. The auxiliary contact members 30 of this circuit interrupter are thereby disengaged to interrupt the circuits extending to all the apparatus in the system embodying my invention. The various relays therefore return to their de-energized condition and are ready to respond in the manner previously described to a reconnection of the generator 3 to the supply circuit 1.

Referring to Fig. 2 of the drawings, like reference numerals have been applied to like parts of apparatus as in Fig. 1.

It will be understood that the system embodying my invention is not limited to the specific details of construction and connections that have been shown in the drawings and described in the foregoing specification, as many changes and modifications may be made therein without departing from the spirit and scope of my invention, as set forth in the appended claims.

I claim as my invention:

1. In an electrical distribution system, the combination with a distribution circuit, a plurality of electrical translating devices for supplying energy thereto, and field-magnet windings for each translating device, of a resistor connected in series relation to the field-magnet winding of one of the translating devices and means for automatically shunting portions of the resistor in response to an increase in the temperature of the field-magnet winding to which it is connected.

2. The combination with a dynamo-electric machine comprising a shunt field-magnet winding and resistor connected in series therewith, of means for automatically shunting portions of said resistor in response to increases in the temperature of said field-magnet winding.

3. In a multi-unit station, a plurality of translating devices, means for causing equal division of the load between hot and cold translating devices in said station, comprising a resistor normally in series with the field winding of the cold machine, and means for shunting portions of said resistor in response to an increase in the temperature of said cold machine.

4. In a multi-unit station, a plurality of electrical translating devices having field windings, and means for connecting said devices to a common distribution circuit, means for equalizing the division of load between said devices when one of them has been operating long enough to become heated and another has just been placed in service, comprising a resistor in series with the field winding of said second-mentioned device, and means for shunting said resistor when the temperature of the second device approaches that of the first.

5. The method of equalizing the division of load between a plurality of generators connected in parallel, of which one has been operating long enough to become heated and another has just been started and is at a temperature below its normal operating temperature, which consists in limiting the current in the field winding of the cold machine, and maintaining said current substantially constant as the temperature of the cold machine increases, by varying the resistance of the field winding circuit.

6. In a multi-unit station, the combination with a plurality of generators therein, of means for causing equal division of the station load between a hot generator and a cold incoming generator, including a resistor in series with the field winding of the cold incoming generator, means for measuring the resistance of the field winding of the cold generator, and means for shunting portions of said resistor as the resistance of the field winding increases as a result of an increase in the temperature of the cold generator.

7. The combination with a generator having a resistor in its field circuit, and a switch for connecting the generator to a distribution circuit, of control means including a resistance-measuring relay associated with said field circuit and relays controlled by said resistance-measuring relay for shunting portions of said resistor in response to an increase in the resistance of said field circuit resulting from an increase in its temperature, and means actuated by said switch for de-energizing said control means when the said switch is open.

In testimony whereof, I have hereunto subscribed my name this 26th day of February, 1924.

PAUL B. STEED.